April 30, 1940.　　　A. M. MARKS　　　2,199,227
CRYSTALLINE FORMATION
Filed June 11, 1937　　　3 Sheets-Sheet 1

INVENTOR
Alvin M. Marks
BY
Blair, Curtis, Dunne + Hayward
ATTORNEYS

INVENTOR
Alvin M. Marks
BY
Blair, Curtis, Dunne + Hayward
ATTORNEYS

April 30, 1940.  A. M. MARKS  2,199,227
CRYSTALLINE FORMATION
Filed June 11, 1937   3 Sheets-Sheet 3

INVENTOR
Alvin M. Marks
BY
Blair, Curtis, Dunne & Hayward
ATTORNEYS

Patented Apr. 30, 1940

2,199,227

UNITED STATES PATENT OFFICE 2,199,227

CRYSTALLINE FORMATION

Alvin M. Marks, Whitestone, N. Y.

Application June 11, 1937, Serial No. 147,650

20 Claims. (Cl. 88—65)

This invention relates to the method and apparatus for coating a support with an optically active crystalline coating and has particular application to coating a transparent supporting structure with a crystalline substance capable of polarizing incident light.

One of the objects of the invention is to provide an improved method for coating a crystalline substance on a supporting surface.

The present invention may be considered an improvement on that disclosed in my copending application Serial No. 662,090, now Patent No. 2,104,949, issued January 11, 1938, wherein is described a method for depositing on a supporting surface a crystalline structure of a crystalline substance having a tendency to grow more rapidly along its $x$ and $y$ axes than along its $z$ axis. Although the example to be described and the principal examples described in the copending application deal with the crystallizing of a substance capable of polarizing light, the invention is not so limited but rather is applicable to coating a suitable surface with a crystalline structure, the crystal of which has a natural tendency to grow more rapidly along its $x$ and $y$ axes than along its $z$ axis.

As described in the above mentioned patent a supporting medium having a clean surface capable of taking a high polish (for example a glass plate) is coated with a substance having a flat crystalline structure (such as iodocinchonidinesulphate) by vertically supporting the plate and partially immersing it in an alcohol-water solution of iodocinchonidinesulphate. Then relative movement is caused to take place between the liquid level of the solution and the surface of the plate while solvent is evaporated from the solution. This causes the crystalline substance to be rejected from the solution onto the plate surface in the proximity of the interfaces of the solution, atmosphere, and plate. The crystalline structure thus grown, while subject to lines of surface tension force (and to other lines of force which may be present), when governing factors are properly related, forms a coating of the iodocinchonidinesulphate on the plate that is substantially optically uniform and "complete," i. e., substantially without holes or interstices. As described in the patent, such factors as the rate of relative movement of the solution surface and plate, the temperature of the solution, vibration, etc., are so regulated as to make the coating substantially "complete."

Figure 1A:
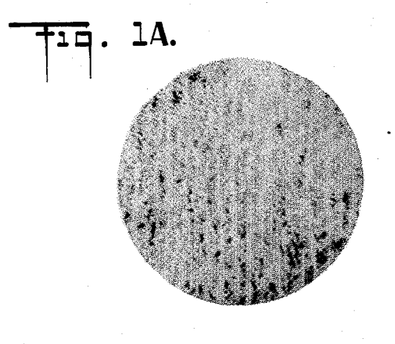
Figures 1A and 1B are prints made from photomicrographs (enlarged, respectively, 88 and 300 times) of a crystal field, or mesh structure, deposited on a glass surface by carrying out a first step of the process to be described.
Figure 1B:
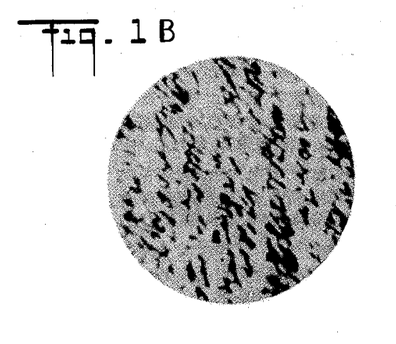

In accordance with the present invention, I prefer so to relate governing factors during this deposition as to produce a crystal field crystalline structure, such as shown in Figures 1A and 1B, to be deposited. The crystalline structure is preferably continuous in the sense that there is no complete break or disruption of the crystal field as it is being deposited. But the crystal field is meshed in the sense that it is filled with microscopic interstices or open areas over which no crystal is deposited.

Figure 4A:
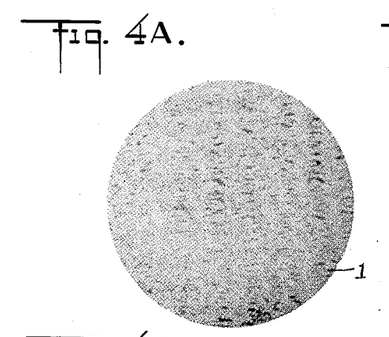
Figures 4A through 4C show a series of prints made from photomicrographs of different crystalline fields that may be obtained with the first step of the process; Figures A and A' in this series are photomicrographs of the crystal field, enlarged, respectively, 88 and 300 times; Prints B and B' are photomicrographs enlarged, respectively, 88 and 300 times; Print C is a photomicrograph enlarged 88 times.
Figure 4B:
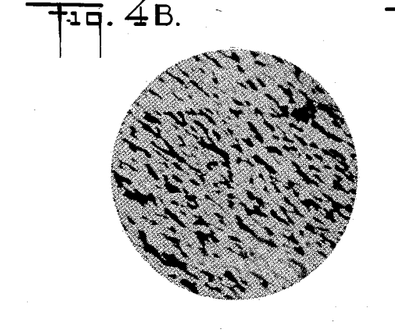
Figure 4C:
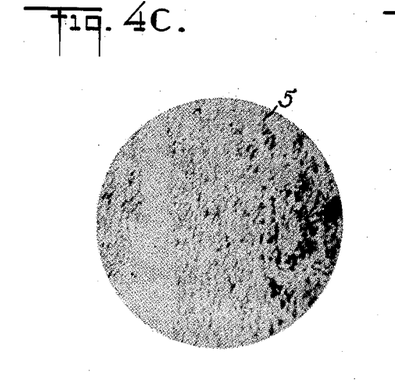

Referring to Figures 4, the crystal field may be of what I term an "island structure" 1 as shown in Examples A, A', in which open areas 2 for the most part join each other; or "semi-meshed" as shown in Examples B, B' where joined open areas 3 and joined crystal areas exist; or "open-meshed," as shown in Example C, where the crystalline structure 5 forms a lattice in which the open areas for the most part do not join.

I have found that plates coated with a crystal field not only can be produced more rapidly than plates having a complete, or substantially complete, crystal coating, but also the alignment of the desired crystalline structure is easier to control and desired uniformity is more easily obtained since factors tending to cause misalignment are rendered less effective. The coating on such a plate is completed, i. e., "filled in" (or what I prefer to call "intensified") by momentarily covering the crystal field with a supersaturated solution of the same crystalline substance, or of a crystalline substance isomorphous with respect to the crystalline base. This treatment causes the crystalline structure of the field to grow along its $x$ and $y$ axes to fill in the open areas. While the interstices are thus "filling" the growth along the $z$ axis is small in comparison with the growth along the $x$ and $y$ axes, and the coating is of a substantially uniform thickness. Inasmuch as the optical orientation of the crystal field is substantially uniform throughout, the crystalline structure completed or grown from the intensification step is also substantially optically uniform.

Figure 6:
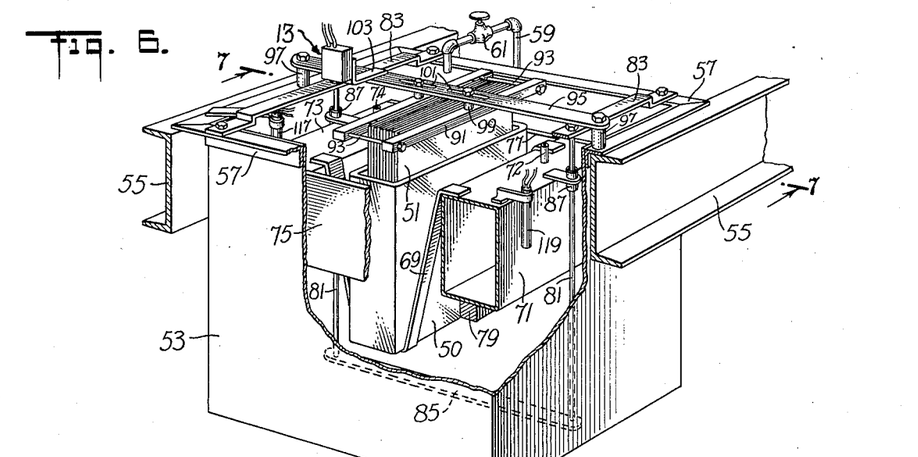
Figure 6 is a perspective view of apparatus for coating plates.
Figure 7:
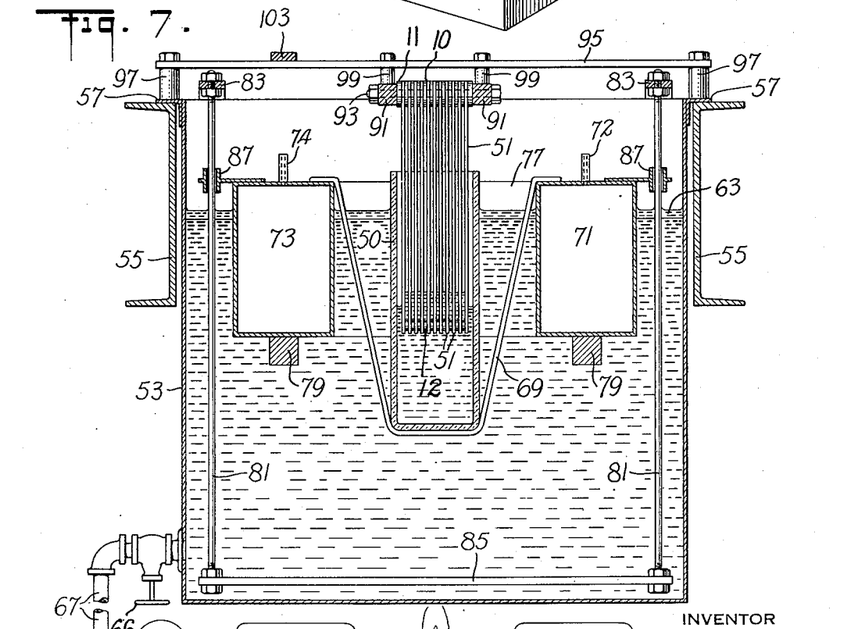
Figure 7 is a vertical section taken on line 7—7 of Figure 6.

Referring to Figures 6 and 7 the improved apparatus shown for depositing such a crystal field on the surface of a supporting medium comprises a glass tank 50 which contains the solution of the crystalline substance to be deposited. A stack of glass plates 51 suitably spaced from each other, as will be described, is suspended in the tank and forms the supporting media on which the crystal field is deposited. The rest of the apparatus forms the means for relatively supporting and moving the tank and plates.

This part of the apparatus comprises an outer tank 53 formed from galvanized iron, or the like, suitably supported by steel channel irons 55 supported by massive standards, not shown, in such manner that the structure possesses sufficient mass to be substantially free from sway, vibration, sagging or the like. Around the top side of the tank 53 is an angle iron 57 which rests on the channel irons and to which other parts of the apparatus may be suitably secured. The tank is filled with water, or other suitable liquid to the desired level for starting a batch operation, from a pipe line 59 having a valve 61. A layer of oil 63 having a relatively low vapor pressure is kept on top of the water to prevent evaporation of the water, such evaporation being undesirable or requiring additional heat as well and increasing the water vapor pressure above the tank.

Flow of liquid from the tank for the purpose of lowering its liquid level at a controlled rate during the deposition is regulated by an orifice 65 in a pipe line 67. A trap is provided in the line 67 ahead of the orifice to catch dirt which might otherwise clog the orifice. A hand valve 66 in the line serves to cut off the flow through the orifice. The rate of flow from the tank is preferably determined by selecting an orifice plate of the size necessary to give the rate of liquid level drop desired and is placed far enough below the body of the liquid so that the change in liquid level does not appreciably affect the head above the orifice.

The tank is preferably constructed so that the liquid surface area is relatively large so that the orifice used may also be relatively large.

Tank 50, preferably of glass or other material not chemically active with the solution, is supported within the water tank 53 by means of a float comprising a frame structure 69 rigidly secured to oppositely disposed pontoons 71 and 73. The two pontoons are rigidly joined together by connecting plates 75, 77 which also form the ends of the pontoons. To keep the center of gravity of this float system as low as desired weights 79 are secured to the bottom of each pontoon. The pressure within the pontoons is kept at atmospheric pressure by means of vents 72, 74 provided in the top of the pontoons.

As the water is run from the tank 53 through the orifice the float assembly is lowered without frictional resistance. Its vertical motion is guided by two vertical rods 81 secured to cross pieces 83 which in turn are supported by the angle iron 57 extending around the top of the water tank. The lower ends of the rod 81 are connected by a metal spacing strip 85. These rods are preferably chromium plated and polished so as to provide a smooth contact for sleeves 87 attached to the pontoons and which slide over the rods. The relative dimensions of the rods and sleeves are chosen to allow sufficient clearance therebetween so that the sleeves will not grab the rods. With this construction the whole float assembly is free to follow minute changes in liquid level but at the same time is constrained to move only vertically.

The frame suspended between the pontoons for actually supporting the glass tank 50 is open at the top so that the glass tank is readily removable and replaceable as desired.

Glass plates, after being suitably cleaned, are stacked side by side and spaced at the top with Bakelite spacers 10 (in the present embodiment $\frac{3}{32}$ of an inch thick) placed between juxtaposed corners of adjacent plates. Cork washers 11 of about the same size as the spacers are placed outside of the upper corners of the end plates over the spacers and the stack is clamped together by clamping strips 91 and clamping bolts 93, the cork washers serving to equalize the pressure over the glass. After the plates are clamped together, glass spacers 12 in the form of discs or rectangles and slightly thicker than $\frac{3}{32}$ of an inch are inserted between the lower corners of the plates. The slight spreading of the plates and their resiliency holds the glass spacers in place.

An advantage of this method of stacking the plates is that the plates are accurately spaced and only glass comes into contact with the solution.

The stacked assembly of plates is supported with respect to the water tank 53 from a cross-piece 95 suitably supported above the angle iron 57 by means of spacing studs 97. Studs 99 extend upwardly from the clamping pieces 91, are bored to receive clamping bolts passing through slots 101 in the cross piece 95 by which bolts the cross piece 95 is bolted to the clamping strips 91. The slots enable the stack to be adjusted with respect to the glass tank 50.

Mounted on a bar 103 extending from the cross piece 95 is a vibrator 13 which may be of the buzzer type and operable to produce a 60 cycle vibration on the stack plate. The vibration thus produced as shown, is in the plane of the plates about the axis formed by the cross piece 95.

With this assembly, when the stack of plates is lowered into the solution in the tank 50 to maximum immersion, as at the start of the process, the solution in the tank 50 rises to a point near its top. The solution between the plates creeps up above the main body of the solution in the tank 50. When conditions of equilibrium are suitably established, as will be described, the valve in line 67 is opened and tank 50 starts lowering.

Since rate of movement of the surface of the plates with respect to the solution level in the tank 50 is one of the factors governing the nature of the crystalline field deposited, it is desirable to control this closely and to keep the desired rate uniform. With the above construction such uniform rate of relative movement is obtained by the water flowing out through the orifice—the lowering of the water level, the reducing of the immersion of the plates in the solution with the consequent rising of the pontoons in the water act together to give the desired uniformity of relative movement.

Before the above described lowering is started the tank assembly is brought to the desired temperature. In the present embodiment the water in tank 53 is heated by gas burners 111, 113 and 115. Burners 111 and 113 are relatively large and hand-controlled, and enable the temperature of the body of liquid in tank 53 to be brought rapidly to a temperature approximating that desired. Burner 115 is smaller and is regulated by means of a suitable off-on valve, controlled by a thermostat 117 during the preliminary heating, and by thermostat 119 during the deposition. The latter is supported from the float and so moves with it and is connected with binding posts by flexible leads. The heating system is so designed that a close temperature control of the water in tank 53 is obtained. This close control of the water maintains a close temperature control of the liquid in the tank 50.

After the desired temperature equilibrium has been established between the water, the solution and the stack of plates, the valve in pipe 67 is opened and the water level in tank 53 starts dropping. Simultaneously the temperature of the solution causes evaporation of the solvent to take place substantially uniformly over the solution surface as well as over the solution between the plates and the crystalline solute is precipitated out on the exposed surfaces of the glass plates. The evaporation of the solution produces a lowering of the solution surface with respect to the plates and so produces a relative velocity which hereinafter will be referred to as velocity due to evaporation. The water flowing out through the orifice also produces a relative movement between the solution level and the plates which will hereinafter be referred to as mass velocity.

Referring to Figures 4 I have found that by varying various controlling factors different types of crystal fields may be deposited. The examples illustrated are obtained from depositing out iodocinchonidinesulphate. Among the controlling facors are per cent saturation of the body of the solution, temperature at which the deposition takes place, the distance $d$ between opposing surfaces of the plates, relative movement between the solution surface and the plate surface due to mass velocity, and others. These factors may be so related as to produce any one of the three types of crystal fields, or laceworks shown, or any intermediate step therebetween. Further, the contours of the crystals, or joined crystal areas may vary from those shown which are illustrative only and are not intended as limiting.

*Per cent saturation*

Working with iodocinchonidinesulphate and keeping the distance $d$ between the plates constant at ¼ of an inch and obtaining the relative movement between the solution surface and plate by evaporation only and working at 27° C., a 25% to 40% saturation produced a structure having such open areas as shown in Example 4A; a 40% to 80% saturation produced a structure such as shown in Example 4B; a 90% saturation produced a structure such as shown in Example 4C; and a 100% saturation produced a structure in which the coating is substantially complete as described in the above mentioned patent.

*Distance between plates*

Using a saturated solution of iodocinchonidinesulphate at 27° C. and keeping other factors constant and the mass velocity zero, but varying the distance between the plates and so varying the amount of solution between them, a distance $d$ of $\frac{1}{64}$ of an inch produced a structure such as shown in Figure 4A; a distance $d$ of $\frac{1}{32}$ of an inch produced a crystal field such as shown in Figure 4B; and a spacing of form $\frac{1}{16}$ to $\frac{1}{8}$ of an inch produced a structure such as shown in Figure 4C; and a spacing of ¼ of an inch or greater produced a substantially complete coating structure.

With regard to this factor of spacing, it is evident from the above example that as the spacing between the plates is reduced the internal movement of the solute in the solution between the plates is reduced so that the only deposit that can take place on the plates is of that solute which is in solution in the liquid between the plates at the start of the deposition.

*Temperature*

The effect of temperature on the character of the deposition is two-fold: As the temperature of the solution is increased the solubility of the iodocinchonidinesulphate in the solution is increased so that (working with a saturated solution) there is available more solute per unit volume of solution. Keeping other factors constant and the mass velocity substantially zero, the effect of temperature on the crystalline structure is generally as follows: Using a saturated solution of iodocinchonidinesulphate at a temperature of 25° C., a structure such as shown in Figure 4B is obtained when using a spacing $d$ of $\frac{1}{32}$ of an inch. A temperature of 35° C., however, gives a structure such as shown in Figure 4C.

Further, as the temperature is increased, the rate of evaporation is increased and the rate of lowering due to evaporation is increased.

*Velocity*

One of the effects of introducing a relative movement between the solution surface and plates by mechanical means, i. e., the mass velocity, is to increase the area over which the solute being deposited is spread. Holding other factors constant, using a spacing $d$ of $\frac{1}{32}$ of an inch, and working at such temperatures as from 65° C. to 73° C., what might be termed relatively high mass velocities produce no deposit at all. But as the velocity is reduced first a structure such as Example A (Figure 4) is deposited out and as the velocity is reduced still further structures such as Examples B, C, etc., are grown. In this connection there appears to be a maximum mass velocity for each temperature above which no deposition takes place, providing of course no artificial means is used to increase the rate of evaporation.

A relation exists also between the velocity by evaporation, the mass velocity, the solubility, and the temperature and may be shown by the following analysis.

Keeping the distance $d$ less than ⅛ of an inch and assuming uniform evaporation over the entire surface of the solution.

Let G = solubility of solute (grams of solute per cc. of solution) at temperature T.
$m$ = grams of solute deposited per unit area on plate, grams per cm².
$V_e$ = downward velocity of the liquid level relative to the plate produced by evaporation only, cm./sec.
$V_m$ = downward "mass velocity," cm./sec. Under this interpretation $V_m$ would be the downward velocity of the liquid level relative to the plate, if $V_e = 0$.
$V_r = (V_e + V_m)$ = total downward velocity cm./sec.
$d$ = distance between plates (less than ⅛").

Consider first the case where $V_m = 0$.
Then $$m = \frac{(G)(d)}{2}$$

This derivation is based on the assumption (which experiments appear to justify) that when the plates are placed close enough together only the solute contained in the solution between the plates at the start of the deposition is deposited on the plates and on the assumption that the face of each plate is coated equally.

Consider now the case where a velocity $V_m$ is superimposed on the velocity $V_e$, so that the total velocity becomes $(V_m + V_e) = V_r$.

During the time $\Delta t$, the weight of solute in the solution evaporated is the same as in Case 1; that is, $(V dV_e \Delta t)$ gms. per unit distance horizontally. However, this weight of solute has now been coated over a total area equalling, $2(V_e + V_m) \Delta t$. The total weight equals $$m2(V_e + V_m \Delta t)$$

Hence $$2m(V_e + V_m)\Delta t = G d V_e \Delta t$$

or $$m = \left(\frac{Gd}{2}\right)\left(\frac{V_e}{V_e + V_m}\right)$$

Solving for $V_m$:

$$V_m = \left(\frac{Gd}{2m} - 1\right)V_e \quad \text{Equation I}$$

Now at temperature $T_o$ holding $V_m$ at zero $$m_o = \frac{G_{T_o} d}{2}$$

At temperature T higher than $T_o$ $$m = \frac{G_T d}{2}$$

Keeping $m = m_o$ by increasing $V_m$ $$\frac{G_T d}{2}\left(\frac{V_e}{V_e + V_m}\right) = \frac{G_{T_o} d}{2}$$

Simplifying $$\frac{V_e + V_m}{V_e} = \frac{G_T}{G_{T_o}} = Q \quad \text{where } Q = \frac{G_T}{G_{T_o}}$$

or
$$V_m = (Q-1)V_e \quad \text{Equation II}$$
$$V_r = QV_e \quad \text{Equation III}$$

Giving numerical values to the example: At temperature $T_o(=25° \text{C.})Q=1$
since $$Q = \frac{G_T}{G_{T_o}}$$

and $G_{T_o} = 3.55$ gms. per liter at 25° C. Four times this solubility = 14.20 grams per liter which is the solubility at 61.8° C.

From Equation II it is evident that $V_m$ may be made very large by increasing the temperature; thus, in this example, from 25° C. to 61.8° C., while the solubility increased four times the velocity due to evaporation increases on the order of two hundred times. The following table demonstrates how the total velocity may be increased many times by raising the temperature only a relatively few degrees:

| T | G | $V_e$ (no forced draft hurrying evaporation). | $V_r$. |
|---|---|---|---|
| 25° C.=$T_o$ | 3.55 gms./liter | 1-3 mm./day | 1-3 mm. per day. |
| 61.8 | 14.2 | 360 mm./day | 1,440 mm. per day. |

*Alignment of crystalline structure with respect to the plane of the solution surface*

The crystalline structure of iodocinchonidine-sulphate may deposit on the glass plate with its polarizing axes at definite but different angles with respect to the plane of the solution surface. For example, I have found that it may deposit out with the polarizing axes at approximately plus 45° to the solution surface, minus 45° to the solution surface, minus 63° to the solution surface, plus 90° to the solution surface, and at 0° to the solution surface. By plus and minus with respect to the solution surface I refer to the $x$ coordinate, which can be considered as extending vertically from the plane of the solution surface. The right hand quadrant formed by the $x$ axes I have referred to as plus and the left hand quadrant as being minus. Possibly there are other angles. To obtain a crystalline coating on the supporting plate of substantially uniform optical orientation the process is so controlled and the constituents used are so selected as to cause one particular alignment with respect to the solution surface to dominate over all recessive alignments. Factors which have a direct bearing on the deposition alignment, as it may be called, are the percentage of water present in the solution and the total velocity between the solution surface and the plate surfaces. These factors are regulated to cause the crystal structure to form with the desired alignment.

With regard to the effect of the water content at a solution temperature of 66° C., if a relative velocity between the solution surface and the plates of about 4.5 inches per hour is used, a solution having 20 per cent water tends to deposit a dominant crystalline structure whose polarizing axis is at approximately plus 45° to the solution surface; using a solution having 28 per cent tends to crystallize out a dominant crystalline structure whose polarizing axis is at minus 63° to the solution surface; using a solution having 40 per cent water tends to crystallize out a dominant crystalline structure whose polarizing axis is at 90° to the solution surface.

The effect of increasing water percentage from 20% to 40% is demonstrated when crystals of iodocinchonidinesulphate are grown unsupported in a solution of the iodocinchonidinesulphate. As the water percentage is increased the length of the crystal grown increases so that the longest diagonal of the crystal gradually shifts with respect to the polarizing axis of the crystal. The shape of an iodocinchonidinesulphate crystal grown from a solution having 20% water is such that its length approximately equals its breadth. Thus, if such a crystal is grown while subject to a velocity factor sufficiently great to exert an aligning effect on the crystal, the crystalline structure deposited out has a 45° alignment, its longest diagonal being at 90° to the solution surface. But as the shape of the crystal is elongated by increasing the water percentage to 28%, the alignment changes to minus 63°, the longest diagonal still remaining at 90° to the solution surface. Thus the shape of the crystal deposited is a factor entering into the alignment, providing, however, that the velocity of movement between the solution surface on which the crystallization is taking place is sufficient to make the velocity a controlling factor.

The relationship between the above alignments and the relative water percentages holds true providing the velocity is sufficient to exert a controlling effort. Thus, by increasing the velocity from one inch per hour to 4.5 inches per hour (using a water content of 20%) the dominant alignment shifts from minus 45° to plus 45°, this latter alignment having a strong blocking out effect on the recessive alignments. However, further increasing the velocity does not change the alignment but maintaining this same velocity, changing the percentage of water, does change the alignment as pointed out.

With each of these percentages of water particles of dirt or other imperfections or upsetting factors may cause other alignments to start depositing out along with the dominant alignment, the dominant alignment, however, eventually blocking out the recessive alignments.

Figure 5:
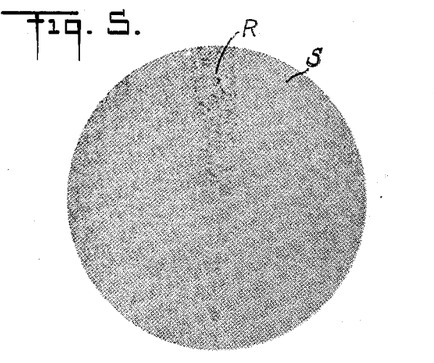
Figure 5 is a print of a photomicrograph of a crystal structure illustrating how a certain dominant crystalline alignment blocks out a recessive crystalline alignment.

Referring to Figure 5, the dark area marked R has an alignment of 90°, whereas the dominant alignments is plus 45°. As the process proceeded the 45° alignment kept blocking out the 90° alignment until eventually only the plus 45° alignment remained. The angle formed by the tapering out 90° alignment deposition becomes smaller and smaller as the velocity is increased above the optimum velocity; and again smaller below the optimum velocity. So it is desirable to regulate this velocity to the optimum value to keep the angle at which a non-desired alignment tapers out large enough to insure its being blocked out soon after it starts forming.

Another factor which apparently aids in enabling one alignment of the crystalline structure deposited to dominate over all other alignments which might deposit out is in causing the crystalline coating to deposit out in the form of a crystal field rather than in the form of a complete coating.

In the present embodiment the factors above discussed are preferably so governed and related as to cause the process to produce an open-mesh or semi-mesh crystal field uniformly oriented. To this end the plates are preferably placed so close together that the relationship of Equation I holds. Further, the temperature at which the process takes place (and consequently the solubility) is maintained as high as practical so that the rate of mechanical movement may be made as high as practical. In addition to these factors the vibrator produces a vibratory motion between the solution surface and plates which aids in obtaining the desired uniform alignment.

In a preferred solution the iodocinchonidinesulphate apparently exists in at least three forms, all of which may be present in a 20% $H_2O$-ethyl alcohol solution. The first form, which I call iodocinchonidinesulphate-a takes the form of flat almost symmetric crystals hexagonal or other shapes derived from an approximately 45° rhombic crystal and has the most desirable light polarizing properties since its extinction color is practically black and its color for parallel transmission is practically colorless. Its reflection color is golden. The second form, which I term iodocinchonidinesulphate-b, forms in relatively long, flat, ribbon-like crystals. Its extinction color is substantially black, but its reflection color is a dull, dark green. The third form, which I call iodocinchonidinesulphate-c, forms in long thin needles, or thread-like crystals. It is colorless on parallel transmission but red on extinction. When in a bulk form and wet with alcohol it is a maroon-brown fluffy mass, similar in appearance to a colored wet absorbent cotton in water.

The iodocinchonidinesulphate-a is stable at ordinary temperature in an ethyl alcohol-water solution up to about 20–30% water. However, at higher temperatures it slowly decomposes to produce a quantity of iodocinchonidinesulphate-b. Additional heating causes the iodocinchonidinesulphate-b to change to iodocinchonidinesulphate-c.

Apparently while a small per cent of iodocinchonidinesulphate-b is desirable because the elongated crystals of iodocinchonidinesulphate-b aid in blocking out the recessive alignment, presence of iodocinchonidinesulphate-c appears to interfere with the deposition of the desired crystal field by depressing the maximum velocity at which deposition will take place.

To the end of obtaining a solution for depositing iodocinchonidinesulphate-a on a surface and obtaining the desired proportions of iodocinchonidinesulphate-a and iodocinchonidinesulphate-b, the following method of preparing a solution has been found satisfactory:

Starting with a solution of 20% water, 4.77% methyl alcohol and 75.23% ethyl alcohol (this mixture is made up by using 16 parts distilled water to 84 parts denatured alcohol, Formula 3A), 200 grams of iodocinchonidinesulphate manufactured as described in the above mentioned patent, is dissolved in 10 liters of the above solvent. This mixture is then heated at approximately at 67° C. for from three to four hours. This heating of the iodocinchonidinesulphate aids in the later deposition in obtaining the desired crystal field. Further, it enables the process to deposit a uniform alignment more quickly at the start. The heat treated iodocinchonidinesulphate is then, by cooling, re-crystallized to about 28° C. to 30° C., and the crystals filtered and dried.

This heated iodocinchonidinesulphate hereinafter called iodocinchonidinesulphate-prime is again dissolved in the above solvent in the proportions of 20 grams of iodocinchonidinesulphate-prime to each liter of solvent. To the mixture is also preferably added a long chain molecule, for example, 5 cc. of Pennsylvania motor oil, S. A. E. 30, per liter of solvent. This solution is placed in the glass tank 50 which is filled to its maximum height. The glass tank or jar is then placed in its rack in the float assembly. The rack may be conveniently removable from the float so as to facilitate handling. Previously the water in the tank 53 has been heated by the large burners to approximately 71° C. and the control has been turned over to the thermostat 117 which is set at 71.5° C. After the tank 50 has been immersed in the water, the liquid in it is relatively rapidly heated and when its temperature reaches about 68° C., the stack of glass plates (or other supporting media having curved or flat surfaces sufficiently rigid to support the crystalline coating without so bending as to cause the coating to fracture) is lowered into tank 50, and the temperature is allowed to rise to about 64° C. Then thermostat 119, set at a control point of 69° C., is turned on to take control of the heating of the water. This enables a temperature equilibrium between the solution in the tank 50, the stack of glass plates, and the water in the tank 53 to be established relatively rapidly. The temperature equilibrium thus established is such that the temperature in the tank 50 is maintained at approximately 66° C.

The valve in the line 67 is now opened and the float is lowered. The nozzle 65 for this particular set-up and solution is preferably selected so as to produce a total relative motion between the body of liquid in the tank 50 and the plates of about 4.5 inches per hour. At this time also, of course, the vibrator is started.

After the liquid level in the tank 50 has travelled the full length of the stack of plates, the stack is removed, disassembled and "intensified" as hereinafter described.

Coming now to the second step, or intensification process; a super-saturated solution of iodocinchonidinesulphate-a in water and ethyl alcohol is made up so as to be super-saturated at several degrees above the temperature of the plate to which it is to be applied. Assuming the temperature of the plates to be about 20° C., such a solution may be made by adding 8 mgs. of iodocinchonidinesulphate-a to each cc. of a solvent comprising 16% water and 84% ethyl alcohol. This is heated to boiling and then quickly cooled to about 45° C.

This solution is applied to the crystalline mesh structure by placing the plate on a table with the crystalline structure upward and flowing the solution over it, allowing the solution to remain on the plate for about 20 seconds. During this time the plate is preferably vibrated in its plane to circulate the intensifying solution and to aid in the crystal-growth. The plate is then tipped and the solution poured off. The plate is left for a few seconds more to allow time for further growth of the crystalline structure from the saturated solution. This procedure may be repeated two or three times in order to thicken the coating, for, naturally, after the first application during which all the interstices are filled up, the crystalline structure grows along its z axis only, meaning the axis of its thickness.

Figure 2A:
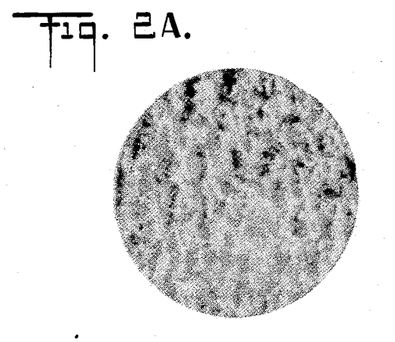
Figures 2A and 2B are prints made from photomicrographs (enlarged, respectively, 88 and 300 times) of a crystalline structure as it may occur at an intermediate stage during a second step of the process.
Figure 2B:
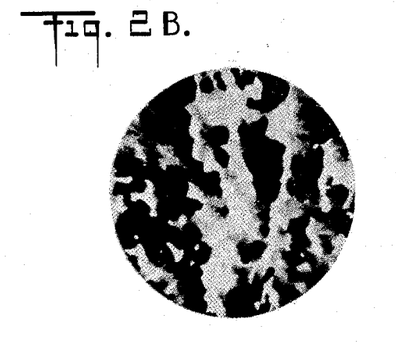
Figure 3A:
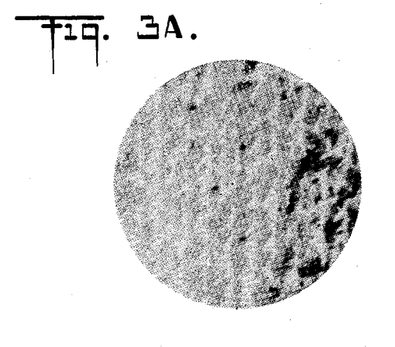
Figures 3A and 3B are prints made from photomicrographs (enlarged, respectively, 88 and 300 times) of the crystalline structure as it may appear at a still later stage during the second step of the process.
Figure 3B:
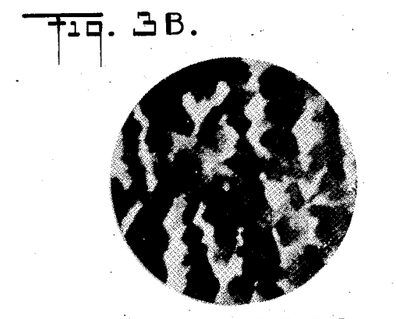

Figures 1 through 3 show how the crystalline mesh fills up or intensifies.

In carrying out the intensification process the temperature of the plate should be 5 to 25° below the temperature of the solution which is already at a temperature rendering it super-saturated. This is possible since iodocinchonidinesulphate-a has a wide range of super-saturation. As a result when the solution is flowed over the plate it is cooled further. Thus, although its crystalline solute is depleted it tends to remain super-saturated due to the further lowering of its temperature. This prevents any tendency for the crystalline structure on the plate to re-dissolve.

By increasing the water content of the super-saturated intensifying solution of iodocinchonidinesulphate and of other iodoalkaloid compounds, the crystal pressure tending to form crystal nuclei is reduced and less crystalline debris or unattached crystals form in the solution. Water contents (in a Formula 3A solution) varying from 16% to 40% water are satisfactory. By directing a blast of air over the solution during the intensification step its super-saturated condition is maintained longer due to the cooling effect produced and to the evaporation of the solvent.

As the intensification solution becomes depleted, i. e., loses its super-saturation, it may be run off and a fresh solution applied to increase further the amount of crystalline coating on the surface. After the final application of the intensifying solution is completed, the plate is sprayed with a jet of clear rapid drying nitrocellulose lacquers in a suitable solvent such as ether and alcohol, present in sufficient quantities to allow the lacquer to be sprayed as from a jet. With a fine, or soft brush previously soaked in the lacquer and stroked over the plate, any superficial crystals of iodocinchonidinesulphate starting to grow on the surface of the crystalline structure are swept or sheared off and the film is rendered clear and optically uniform. The plate is then again washed with clear lacquer which is allowed to dry on the plate to form a protective coating.

The application of the lacquer prevents further crystallization upon the crystalline film and so prevents the formation of any appreciable amount of debris on the crystalline structure.

This intensification process apparently works more satisfactorily when the interstices or holes are not more than 2/100 of an inch across the greatest dimension for, if the interstices have greater dimensions, a mechanically weaker coating may be formed.

That the intensification process produces a film of substantially uniform thickness is evident from a consideration of the fact that the rate of growth of the crystal is very slow along its z axis so that as the interstices are filling by crystal growth along the x and y axes, which is relatively rapid, any crystalline growth along the z axis is also effectively extended to the new growth taking place as a result of the intensification solution.

I claim:

1. The method of crystallizing a crystalline substance from a saturated solution thereof on a supporting surface of a support to form a crystalline structure having substantially uniform optical orientation, comprising arranging a number of the supports side by side, spaced and with their supporting surfaces opposing one another, partially immersing said supports in said solution, evaporating solvent from the solution between the supports, the spacing between said supports being substantially less than one quarter inch and such as to prevent during the evaporation such migration of the solute and solvent between the supports to and from the body of the solution as would free the solution originally trapped therebetween, and relatively moving the supports and body of the solution to remove the crystalline structure deposited from the solution.

2. The method of crystallizing a crystalline substance from a saturated solution thereof on a glass plate to form a crystalline structure on the surface of the plate having substantially uniform optical orientation comprising arranging a number of the plates side by side but spaced with their supporting surfaces opposing one another, partially immersing said plate in said solution, evaporating solvent from the solution between the plates, maintaining such spacing between the plates substantially less than one quarter inch and such as to prevent during the evaporation such migration of the solvent and solute between the plates to and from the body of the solution as would permit the solution originally trapped therebetween to infiltrate with the main body of the solution, and relatively moving the plates and the body of the solution to remove the crystalline structure deposited on the plates from the solution.

3. The method of crystallizing a crystalline substance from a saturated solution thereof on a glass plate to form a crystalline structure on the surface of the plate having substantially uniform optical orientation comprising arranging a number of the plates side by side but spaced less than ⅛ inch apart with their supporting surfaces opposing one another, partially immersing said plates in said solution, evaporating solvent from the solution between the plates to cause said crystalline substance to crystallize out on said surface, relatively moving the plates and the body of the solution simultaneously with the evaporating of the solvent to remove the crystalline structure deposited on the plates from the solution, and utilizing the relative movement to control the alignment of the crystalline structure deposited and to control the character of the crystalline structure as to its "island," "semi-meshed" or "open-meshed" formation.

4. The method of crystallizing a crystalline substance from a saturated solution thereof on a glass plate to form a crystalline structure on the surface of the plate having substantially uniform optical orientation comprising arranging a number of the plates side by side but spaced less than ⅛ inch apart with their supporting surfaces opposing one another, partially immersing said plates in said solution, evaporating solvent from the solution between the plates to cause said crystalline substance to crystallize out on said surface, relatively moving the plates and the body of the solution simultaneously with the evaporating of the solvent to remove the crystalline structure deposited on the plates from the solution, and utilizing the relative movement to control the mass of crystalline substance deposited per unit area of glass surface.

5. The method of crystallizing a crystalline substance from a saturated solution thereof on a supporting surface of a support to form a crystalline structure having substantially uniform optical orientation, comprising arranging a number of the supports side by side, spaced and with their supporting surfaces opposing one another, partially immersing said supports in said solution, evaporating solvent from the solution between the supports to cause said crystalline substance to crystallize out on said surfaces, the spacing between said supports being substantially less than one quarter inch and such as to prevent during the evaporation substantial migration of the solute and solvent between the supports to and from the body of the solution, relatively moving the supports and body of the solution simultaneously with the evaporating of the solvent to remove the crystalline structure deposited from the solution, and maintaining as described the spacing between the supports, the rate of evaporation, the concentration of the solute, and the rate of relative movement to control the mass per unit area of crystalline substance deposited on the supporting surfaces in accordance with the relationship $$m = \left(\frac{Gd}{2}\right)\left(\frac{V_e}{V_e + V_m}\right)$$

as described wherein $m$ is the weight of solute deposited per unit area on the supporting surface, $G$ is the solubility of the crystalline substance at temperature $T$, $d$ is the distance between the supporting surfaces $V_e$ is the downward velocity of the liquid level of the solution relative to the supporting surfaces produced by evaporation only, and $V_m$ is the downward "mass velocity" and is the velocity that would exist if $V_e$ equals zero.

6. The method of increasing the mass per unit area of a crystalline coating of substantially uniform axial orientation comprising applying to the coating a supersaturated solution of a crystalline substance isomorphous with respect to the crystalline coating, said solution being supersaturated at least several degrees above the temperature of the original coating, causing the solute thereof to deposit out of said solution on to said coating, and utilizing the crystalline forces of the crystalline structure of the existing crystalline coating to cause the solute crystallizing out to grow on the crystalline structure of said crystalline coating to form with the original coating a substantially unitary crystalline structure having the same axial orientation as the original coating but having a greater mass per unit area than said original coating, and lowering the temperature of the liquid in contact with the crystalline coating to maintain the supersaturated condition thereof throughout at least several degrees above the temperature of the original coating.

7. The method of increasing the mass per unit area of a crystalline coating of substantially uniform axial orientation comprising applying to the coating a supersaturated solution of the crystalline substance, said solution being supersaturated at least several degrees above the temperature of the original coating, causing the solute thereof to deposit out of said solution on to said coating, and utilizing the crystalline forces of the crystalline structure of the existing crystalline coating to cause the solute crystallizing out to grow on the crystalline structure of said crystalline coating to form with the original coating a substantially unitary crystalline structure having the same axial orientation as the original coating but having a greater mass per unit area than said original coating, and regulating the temperature of the coating and solution to maintain said solution supersaturated at least several degrees above the temperature of the original coating to cause solute of the supersaturated solution to crystallize out while the supersaturated condition of the solution is maintained throughout.

8. The method of increasing the mass per unit area of a crystalline coating of substantially uniform axial orientation comprising applying to the coating a supersaturated solution of the crystalline substance, said solution being supersaturated at least several degrees above the temperature of the original coating, causing the solute thereof to deposit out of said solution on to said coating, and utilizing the crystalline forces of the crystalline structure of the existing crystalline coating to cause the solute crystallizing out to grow on the crystalline structure of said crystalline coating to form with the original crystalline coating a substantially unitary crystalline structure having the same axial orientation as the original coating but having a greater mass per unit area than said original coating, and regulating the temperature of the coating and solution to maintain said solution supersaturated at least several degrees above the temperature of the original coating to cause the solute of the supersaturated solution to crystallize out and grow on the crystalline coating while the supersaturated condition of the solution is maintained throughout, and stopping further crystallization by removing the supersaturated solution from the coating with a liquid capable of stopping further crystallization without dissolving said coating.

9. The method of completing a crystalline coating in the form of interlocking crystal areas and open areas, the crystals of which have substantially uniform optical orientation, comprising applying to the coating a supersaturated solution of the crystalline substance to cause crystals to grow from the solute of the solution to complete the crystalline coating and form a substantially unitary crystalline structure of the same orientation as said original coating.

10. The method of coating a supporting surface with an optically continuous crystalline coating of substantially uniform axial orientation, comprising first providing the surface with a crystalline coating of substantially uniform axial orientation, applying to the crystalline coating a supersaturated solution of the crystalline substance, said solution being supersaturated at least several degrees above the temperature of the original coating, causing the solute thereof to deposit out of said solution on to said coating while maintaining the supersaturated condition throughout, utilizing the crystalline forces of the crystalline structure of the existing crystalline coating to cause the solute crystallizing out to grow on the crystalline structure of said crystalline coating to form with the original coating a substantially unitary crystalline structure having the same axial orientation as the original coating but having a greater mass per unit area than said original coating.

11. The method of coating a supporting surface with an optically continuous crystalline coating of a substantially uniform optical orientation, comprising first crystallizing on the supporting surface a crystal field of an island, semi-mesh or open-mesh structure in which the crystalline structure is of substantially uniform optical orientation, and applying to the supporting surface thus coated a super-saturated solution of the crystalline substance to cause the crystal field to grow from the solute of the solution to complete the coating to form a substantially unitary crystalline structure having the same optical orientation as said original coating.

12. The method of coating a supporting surface with an optically continuous crystalline coating of a substantially uniform optical orientation, comprising first crystallizing on the supporting surface a crystal field, the crystalline structure of which has substantially uniform optical orientation and comprises crystal and open areas, the crystal areas not being separated by more than 2/100 of an inch, and applying to the supporting surface thus coated a super-saturated solution of the crystalline substance to cause the crystal field to grow from the solute of the solution to complete the coating to form a substantially unitary crystalline structure having the same optical orientation as said original coating.

13. The process of increasing the mass per unit area of a crystalline coating of substantially uniform axial orientation, comprising applying to the crystalline coating a super-saturated solution of the crystalline substance, said solution being supersaturated at least several degrees above the temperature of the original coating causing the solute thereof to deposit out of said solution on to said coating while maintaining the supersaturated condition throughout, utilizing the crystalline forces of the crystalline structure of the existing crystalline coating to cause the solute crystallizing out to grow on the crystalline structure of said crystalline coating to form with the original coating a substantially unitary crystalline structure having the same axial orientation as the original coating but having a greater mass per unit area than said original coating, and slowing down the rate of crystalline growth on the crystalline coating by using a solution having an appreciable water content.

14. The method of crystallizing a crystalline substance from a saturated solution thereof on a glass plate to form a crystalline structure on the surface of the plate having substantially uniform optical orientation comprising arranging a number of the plates side by side but spaced with their supporting surfaces opposing one another, partially immersing said plates in said solution, evaporating solvent from the solution between the plates, maintaining the spacing between the plates substantially less than one quarter of an inch such as to prevent during the evaporation such migration of the solvent and solute between the plates to and from the body of the solution as would permit the solution trapped therebetween to escape to the main body of the solution, relatively moving the plates and the body of the solution to remove the crystalline structure deposited on the plates from the solution, and subjecting the plates to low amplitude vibration in the plane of the plates.

15. In a process of depositing iodocinchonidinesulphate-a on a supporting surface by causing rejection of the iodocinchonidinesulphate-a from solution on to a supporting surface in the vicinity of the inter-faces of the solution surface, supporting surface, and the medium above the solution surface, the step of maintaining in the solution a quantity of iodocinchonidinesulphate-b to aid in the crystallization of a dominant alinement.

16. In a process for crystallizing a crystalline substance from a solution thereof on rectilinear supporting surfaces of rectilinear supports to form crystalline structures on the supporting surfaces having substantially uniform optical orientation and in which process the supports are arranged to dip vertically partially immersed in the solution; the method of producing relative movement between the supports and liquid level of the solution which comprises floating said solution on a body of liquid and utilizing the buoyancy of said body of liquid as the sole supporting force for supporting said solution, and withdrawing the liquid to lower the level of said body of liquid and so the level of said solution.

17. The method of crystallizing a crystalline substance from a saturated solution thereof on a supporting surface of a support to form a crystalline structure having substantially uniform axial orientation and using a crystalline substance capable of forming crystalline structures on the supporting surface whose crystalline axes are at different angles with respect to the solution surface, comprising, arranging a number of the supports side by side, spaced and with their supporting surfaces opposing one another, partially immersing said supports in said solution, evaporating solvent from the solution between the supports, the spacing between said supports being substantially less than one quarter of an inch and such as to prevent during the evaporation such migration of the solute and solvent between the supports to and from the body of the solution as would free the solution originally trapped therebetween, and relatively moving the supports and the body of the solution to remove the crystalline structure deposited from the solution to control the selective deposition of the one crystalline structure with reference to the angle of its axis with respect to the solution surface.

18. The method of crystallizing iodocinchonidinesulphate from a saturated solution thereof on a supporting surface of a support to form a crystalline structure thereof having substantially uniform optical orientation, comprising, dissolving the iodocinchonidinesulphate in a solution having ten to forty percent water, arranging a number of the supports side by side, spaced with their supporting surfaces opposing one another, partially immersing said supports in said solution, evaporating solvent from the solution between the supports, the spacing between said supports being substantially less than one quarter of an inch and such as to prevent during the evaporation such migration of the solute and solvent between the supports to and from the body of the solution as would free the solution originally trapped therebetween, and relatively moving the supports and the body of the solution to remove the crystalline structure deposited from the solution to control the selective deposition of one iodocinchonidinesulphate crystalline structure with reference to the angle of its axis with respect to the solution surface.

19. The method of crystallizing an iodoalkaloid compound from a saturated solution thereof on a supporting surface of a support to form a crystalline structure thereof having substantially uniform axial orientation, comprising, arranging a number of the supports side by side, spaced with their supporting surfaces opposing one another, partially immersing said supports in said solution, evaporating solvent from the solution between the supports, the spacing between said supports being substantially less than one quarter of an inch and such as to prevent during the evaporation such migration of the solute and solvent between the supports to and from the body of the solution as would free the solution originally trapped therebetween, and relatively moving the supports and the body of the solution to remove the iodoalkaloid crystalline structure deposited from the solution, said iodoalkaloid compound tending in depositing to form different crystalline structures whose crystalline axes are at different angles with respect to the solution surface but the boundaries of which converge as the different crystalline structures are deposited, and regulating the velocity of relative movement to maintain the angle of convergence of one of the crystalline structures sufficient to block out further deposition of the other crystalline structures.

20. The method of improving the optical properties of a thin crystalline coating consisting of a crystalline structure of substantially uniform axial orientation, said method comprising the steps of, applying to the crystalline coating a super-saturated solution of a crystalline substance isomorphous with respect to the crystalline coating, said solution being super-saturated at least several degrees above the temperature of the original coating, causing the solute to deposit out of said solution onto said coating while maintaining the super-saturated condition of the solution throughout, and utilizing the crystalline forces of the crystalline structure of the existing crystalline coating to cause solute crystallizing out to grow on the crystalline structure of said crystalline coating to form with the original coating a substantially unitary crystalline structure having the same axial orientation as said original coating and having a greater mass per unit area than said original coating.

ALVIN M. MARKS.